US009846045B2

(12) United States Patent
Singh et al.

(10) Patent No.: US 9,846,045 B2
(45) Date of Patent: *Dec. 19, 2017

(54) SYSTEM AND METHOD FOR NAMING A LOCATION BASED ON USER-SPECIFIC INFORMATION

(71) Applicant: Scenera Mobile Technologies, LLC, Raleigh, NC (US)

(72) Inventors: Munindar P. Singh, Cary, NC (US); Mona Singh, Cary, NC (US)

(73) Assignee: SCENERA MOBILE TECHNOLOGIES, LLC, Pprtsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,487

(22) Filed: May 9, 2016

(65) Prior Publication Data

US 2016/0252356 A1    Sep. 1, 2016

Related U.S. Application Data

(63) Continuation of application No. 14/294,770, filed on Jun. 3, 2014, now Pat. No. 9,338,240, which is a continuation of application No. 11/425,623, filed on Jun. 21, 2006, now Pat. No. 8,750,892.

(51) Int. Cl.
| | |
|---|---|
| *H04W 4/02* | (2009.01) |
| *G01C 21/26* | (2006.01) |
| *H04L 29/12* | (2006.01) |
| *H04L 29/08* | (2006.01) |

(52) U.S. Cl.
CPC ........ *G01C 21/26* (2013.01); *H04L 29/12122* (2013.01); *H04L 61/1547* (2013.01); *H04L 67/18* (2013.01); *H04L 67/306* (2013.01); *H04W 4/02* (2013.01)

(58) Field of Classification Search
CPC ..................................................... H04W 4/028
USPC ......... 455/414.1, 456.1, 456.3, 456.5, 456.2, 455/422.1; 342/457, 450, 453; 701/532, 701/533
See application file for complete search history.

(56) References Cited

U.S. PATENT DOCUMENTS

| | | |
|---|---|---|
| 5,493,677 A | 2/1996 | Balogh et al. |
| 6,275,707 B1 | 8/2001 | Reed et al. |
| 6,374,179 B1 | 4/2002 | Smith et al. |
| 6,411,724 B1 | 6/2002 | Vaithilingam et al. |
| 6,546,257 B1 | 4/2003 | Stewart |
| 6,629,104 B1 | 9/2003 | Parulski et al. |
| 6,668,173 B2 | 12/2003 | Greene |
| 6,714,791 B2 | 3/2004 | Friedman |
| 6,804,684 B2 | 10/2004 | Stubler et al. |

(Continued)

*Primary Examiner* — Cong Tran

(57) ABSTRACT

A method, system, and device for naming a location at which a user is present with a mobile communication device, including retrieving general information relating to the location, the general information managed by or for an entity other than the user; comparing the retrieved general information relating the location to user-specific information managed by or for the user; identifying at least one atemporal correlation between the retrieved general information and the user-specific information; generating a plurality of names for the location based on the atemporal correlation between the retrieved general information and the user-specific information providing the plurality of names for the location for selection; and storing the name selected for the location from the plurality of names.

38 Claims, 5 Drawing Sheets

(56) References Cited

U.S. PATENT DOCUMENTS

| | | |
|---|---|---|
| 6,831,598 B2 | 12/2004 | Saint-Hilaire et al. |
| 6,850,188 B1 | 2/2005 | Lee et al. |
| 6,885,874 B2 | 4/2005 | Grube et al. |
| 6,920,328 B2 | 7/2005 | Wollrab |
| 6,952,181 B2 | 10/2005 | Karr et al. |
| 6,975,941 B1 | 12/2005 | Lau et al. |
| 6,999,777 B1 | 2/2006 | Ganesh |
| 7,155,456 B2 | 12/2006 | Abbott, III et al. |
| 7,283,827 B2 | 10/2007 | Meadows et al. |
| 7,353,034 B2 | 4/2008 | Haney |
| 7,395,507 B2 | 7/2008 | Robarts et al. |
| 7,512,889 B2 | 3/2009 | Newell et al. |
| 7,533,082 B2 | 5/2009 | Abbott et al. |
| 7,614,001 B2 | 11/2009 | Abbott et al. |
| 2002/0042278 A1 | 4/2002 | Crockett et al. |
| 2002/0115446 A1 | 8/2002 | Boss et al. |
| 2004/0027624 A1 | 2/2004 | Parulski et al. |
| 2004/0133605 A1 | 7/2004 | Chang et al. |
| 2004/0174434 A1 | 9/2004 | Walker et al. |
| 2004/0194025 A1 | 9/2004 | Hubert et al. |
| 2004/0205482 A1 | 10/2004 | Basu et al. |
| 2004/0248591 A1 | 12/2004 | Fish |
| 2005/0050043 A1 | 3/2005 | Pyhalammi et al. |
| 2005/0091276 A1 | 4/2005 | Brunswig et al. |
| 2005/0192030 A1 | 9/2005 | Asthana et al. |
| 2005/0208954 A1 | 9/2005 | Boss et al. |
| 2005/0234922 A1 | 10/2005 | Parekh et al. |
| 2005/0261822 A1 | 11/2005 | Wako |
| 2005/0288036 A1 | 12/2005 | Brewer et al. |
| 2006/0015925 A1 | 1/2006 | Logan |
| 2007/0032268 A1 | 2/2007 | Gotfried |
| 2007/0067098 A1 | 3/2007 | Zelentsov |
| 2007/0143281 A1 | 6/2007 | Smirin et al. |
| 2007/0288164 A1 | 12/2007 | Gordon et al. |
| 2007/0298813 A1 | 12/2007 | Singh |
| 2008/0139244 A1 | 6/2008 | Vau et al. |
| 2008/0227473 A1 | 9/2008 | Haney |

SYSTEM AND METHOD FOR NAMING A LOCATION BASED ON USER-SPECIFIC INFORMATION

CROSS-REFERENCE TO RELATED APPLICATION

The present invention is a continuation of co-pending U.S. patent application Ser. No. 14/294,770, filed Jun. 3, 2014, which is a continuation of U.S. patent application Ser. No. 11/425,623 (now U.S. Pat. No. 8,750,892), filed Jun. 21, 2006, which is related to U.S. patent application Ser. No. 11/425,650 (now U.S. Pat. No. 8,099,086) entitled "SYSTEM AND METHOD FOR PROVIDING A DESCRIPTOR FOR A LOCATION TO A RECIPIENT," filed concurrently with U.S. patent application Ser. No. 11/425,623, and assigned to the assignee of the present application and herein incorporated by reference.

BACKGROUND

Handheld electronic devices, such as personal digital assistants (PDAs), mobile phones, digital cameras, and the like, offer mobility and a variety of services to their respective users. They are typically configured to transmit and receive data to and from other devices via a wired or wireless connection. Most mobile phones, for example, can provide Internet access, maintain a personal address book, provide messaging capabilities, capture digital images, as well as place phone calls.

Many devices, in particular mobile phones, can identify their respective locations within a certain range depending on the device and location identifying technique. Some devices can use sophisticated position determining systems, such as a Global Positioning System (GPS). The GPS is a satellite-based radio navigation system that uses signals from three or four satellites to compute the current latitude, longitude and elevation of a GPS receiver in the device anywhere on earth down to within a few meters. Other devices can use a location identifying technique based on which base station is servicing the device, that is, the location of the device is within a range of the base station from which a call is made. Other devices can use location identifying techniques based on triangulation between the device and at least two base stations.

The device's location, typically represented by geospatial coordinates, can be used in a variety of ways. It can be used to describe a digital image captured at the location and it can then be stored as metadata for categorizing the image. The location can also be used to link other information with the location, such as a favorite restaurant or bookstore.

As stated above, the location is typically represented by geospatial coordinates. Geographical information systems (GISs) exist that map geospatial coordinates to street addresses or location names. Accordingly, the street address or name corresponding to the geospatial coordinates can be displayed to the user and/or utilized by an application in the device, e.g., to associate the name with an image.

While providing the street address or name of a location can be helpful, e.g., to orient a user or to categorize a set of images, the street address or name itself can hold little or no relevance to the user. For example, if the user has forgotten the name of a particular business, the address of the business is not particularly useful.

One way to address this would be to allow the user to assign a relevant name for the location manually. For example, the user can name a location based on a favorite store, e.g., "Starbucks," at that location, or based on a class, e.g., Calculus, the user is attending at that location. In this manner, the location name can be personalized and relevant to the user. This solution, however, requires the user to think of and to enter a name for each location, which can be tedious when several locations need to be named and when the most appropriate name might not be readily apparent to the user.

SUMMARY

Accordingly, a system and method for naming a location are described. According to one exemplary embodiment, the system includes a mobile communication device equipped with a position locator system that is configured to identify a location of the device, a first data store for storing general information that is managed by or for an entity other than the user and that is related to the location, a second data store for storing user-specific information that is managed by or for the user, and a name generation module. According to aspects of one embodiment, the name generation module is configured to receive the location of the mobile communication device, to retrieve from the first data store general information relating to the location, and to generate names for the location based on at least one atemporal correlation between the general information and the user-specific information. The names are provided for selection of a name and the name selected for the location from the plurality of names is stored.

According to another exemplary embodiment, a mobile communication device includes a communication interface coupled to a network, a position locator system that is configured to identify a location of the device, and a name generation module that receives the location of the mobile communication device, uses the location to retrieve general information relating to the location over the network via the communication interface, and generates names for the location based on at least one atemporal correlation between the retrieved general information and user-specific information that is managed by or for a user of the device. The names are provided for selection of a name and the name selected for the location from the plurality of names is stored.

According to another exemplary embodiment, a server comprises a communication interface for communicating with a mobile communication device associated with a user over a network and a name generation module that receives a location of the mobile communication device over the network via the communication interface, uses the location to retrieve general information relating to the location over the network via the communication interface, generates names for the location based on at least one atemporal correlation between the retrieved general information and user-specific information that is managed by or for a user of the device, and provides the names to the device over the network via the communication interface. The names are provided for selection of a name and the name selected for the location from the plurality of names is stored.

According to another exemplary embodiment, a method of naming a location at which a user is present with a mobile communication device comprises retrieving general information that is managed by or for an entity other than the user and that is related to the location. The retrieved general information is then compared to user-specific specific information managed by or for the user to identify at least one atemporal correlation between the retrieved general information and the user-specific information. Names for the location is generated based on the at least one atemporal correlation. The names are provided for selection of a name and the name selected for the location from the plurality of names is stored.

BRIEF DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, the geospatial coordinates corresponding to the location of a mobile communication device associated with a user are used to retrieve general information relating to the location. The general information can include postal addresses at or near the location, business/personal names corresponding to the postal addresses and phone numbers. In one embodiment, the general information is retrieved from one or more GISs and directories. The general information is then compared to user-specific information, such as, e.g., entries in the user's personal address book and calendar. Atemporal correlations between the general information and the user-specific information are identified and one or more names for the location are generated based on the atemporal correlations. As used here, the phrase "atemporal correlation" refers to a correlation in which a time or date that information being correlated was created and/or might refer to is not considered in determining the correlation. The one or more names are then presented to the user.

The presented names are, by their nature, relevant to the user because they are based on information specific to the user, and not entirely based on general information such as that provided in a generic map. The names are generated automatically and presented to the user so that the user only needs to select a name. The selected name can then be associated with the location and stored so that the name can be retrieved when the user returns to the location.

Figure 1:
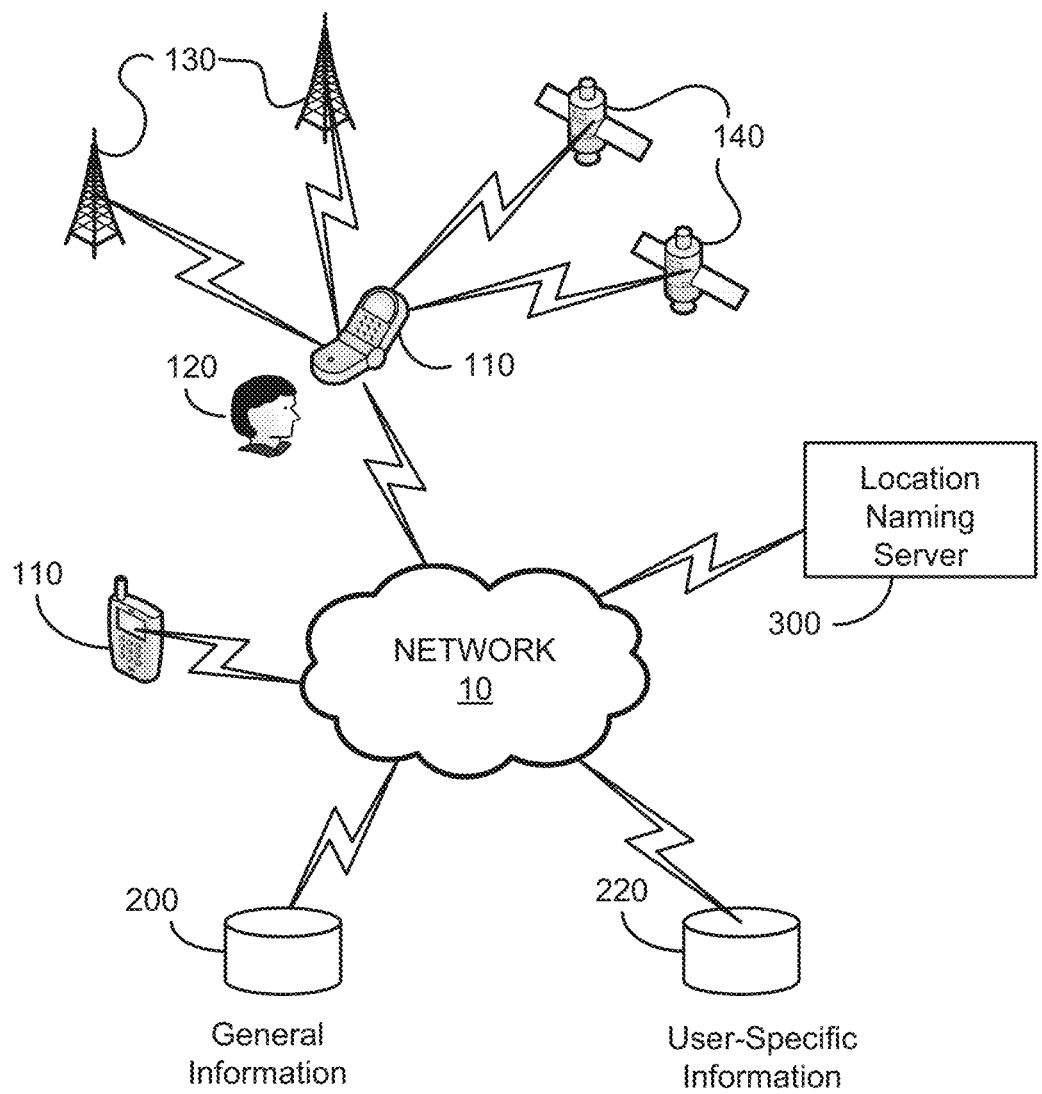
FIG. 1 is a block diagram illustrating an exemplary location naming system according to an exemplary embodiment.

FIG. 1 is block diagram illustrating an exemplary location naming system 100 according to an exemplary embodiment.

One or more network-enabled mobile communication devices 110, such as a digital camera/phone, PDA, laptop or the like, are in communication with a location naming server 300 over a network 10. A first data store 200 includes general information relating to a plurality of locations and is accessed by the device 110 or the location naming server 300 over the network 10. In one embodiment, the general information is managed by or for an entity other than a user 120 of the mobile communication device 110. The general information can include information related to the user 120 as well as for other users, but is not generally viewed as the user's data. The general information is typically public information, but can include private information as well, e.g., information that is available through the use of pay services. A second data store 220 includes user-specific information managed by or for the user 120. The user-specific information is generally viewed as the user's data, and can include information related to the user 120 as well as for other users. The user-specific information can be managed by the user, e.g., on his or her personal digital assistant (PDA) or can be managed for the user by another entity, such as via a remote data service. Typically, the user-specific information is private information, but can include public information as well, such as information the user 120 chooses to share with others. The device 110 and the location naming server 300 can access the second data store 220 over the network 10.

Figure 2A:
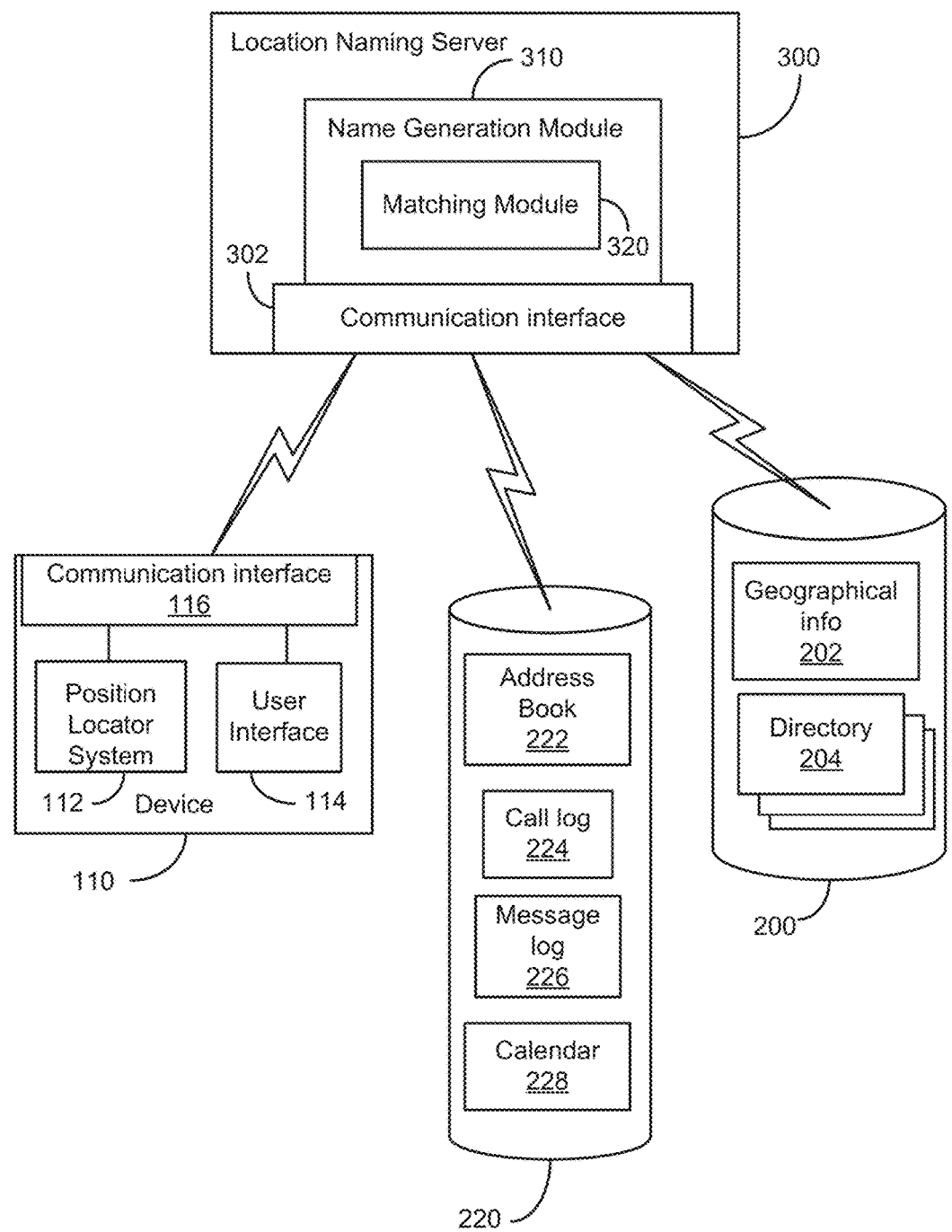
FIGS. 2A-2C are more detailed block diagrams illustrating the location naming system according to several exemplary embodiments.

FIG. 2A is a more detailed block diagram of the location naming system according to an exemplary embodiment. Each device 110 includes a means for tracking a position of the device 110. For example, the device 110 can include a position locator system 112 that tracks the position of the device 110. The position locator system 112 can be the well known global positioning system (GPS) that utilizes satellites 140 (FIG. 1) to determine the device's longitudinal and latitudinal position. Alternatively, the position locator system 112 can be configured to utilize one or more base stations 130 within communication range to determine the device's location. Each mobile communication device 110 also includes means for communicating with the location naming server 300. For example, the device 110 can include a communication interface 116 coupled to a user interface 114 that allows the user 120 to use the device 110 to communicate with the server 300 over a wireless network 10 using one or more communication protocols.

The location naming server 300 can be a personal computer or other device capable of storing and managing data. The location naming server 300 includes a communication interface 302 to transmit and receive data over the network 10. In one embodiment, the location naming server 300 is configured to retrieve data from the first 200 and second 220 data stores over the network 10.

As stated above, the first data store 200 includes general information relating to a plurality of locations managed by or for an entity other than a user 120 of the mobile communication device 110. In one embodiment, the first data store 200 can include geographical information 202 that maps geospatial coordinates to information relating to the location, such as addresses and/or names. The first data store 200 can also include one or more directories 204 that map addresses to address-specific information, such as telephone numbers, electronic message addresses, names and business names. The geographical information 202 and directories 204 can be managed by a public or private entity. For example, a private directory 204 can include information relating to employees of a private company, while a public directory 204 can include information relating to businesses in a city, e.g., "The Yellow Pages."

In contrast to the first data store 200, the second data store 220 stores user-specific information managed by or for the user. The user-specific information can include user-specific items such as the user's address book 222 that organizes contact information for a plurality of contacts, a call log 224 that stores call information, e.g., information relating to calls placed and received by the user, a message log 226 that stores message information and a calendar 228 that stores events and appointments. Each user-specific item can include fields associated with the nature of the item. For example, the address book 222 can include a field for a name of a person or business, and subfields corresponding to a phone number, an email address, a street address, and other information related to the person or business. The message log 226 can include fields for the email address and name of the recipient.

According to one embodiment, the location naming server 300 includes a name generation module 310. The name generation module 310 is configured to generate and provide, upon request by a user, one or more names for a location based on atemporal correlations between the general information relating to the location and the user-specific information associated with the user. In one embodiment, the name generation module 310 includes a matching module 320 that is configured to compare at least a portion of the general information to at least a portion of the user-specific information and to determine when an atemporal correlation exists.

The system 100 illustrated in FIG. 1 and FIG. 2A is but one exemplary arrangement. In this arrangement, a "thin" mobile communication device 110 can be accommodated because the user's specific information 220 can be stored remotely and the name generation module 310 can be hosted by a server 300. Other system arrangements can be designed by those skilled in the art. For example, in one embodiment, the second data store 220 can be coupled to the location naming server 300 so that the location naming server 300 securely manages the user-specific information for the user 120.

Figure 2B:
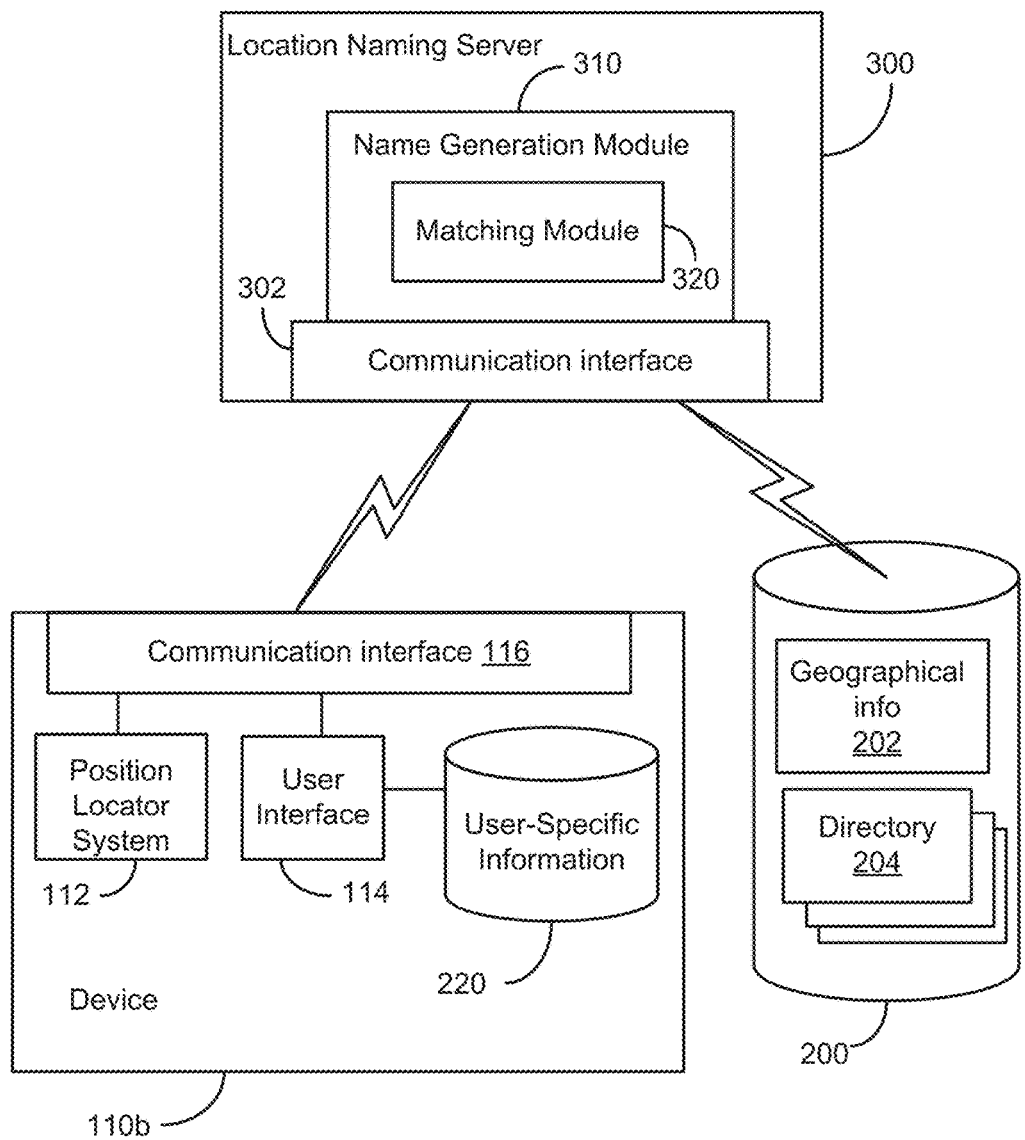

In another embodiment, shown in FIG. 2B, the mobile communication device 110b can store and manage the user-specific information 220 internally. In this embodiment, the user 120 can select one or more user-specific items, e.g., the address book 222 and the call log 224, the location the name should be based on, and can push the selected user-specific items 222, 224 to the location naming server 300. Alternatively, the name generation module 310 can pull from the communication device 110b the user-specific information it needs.

Figure 2C:
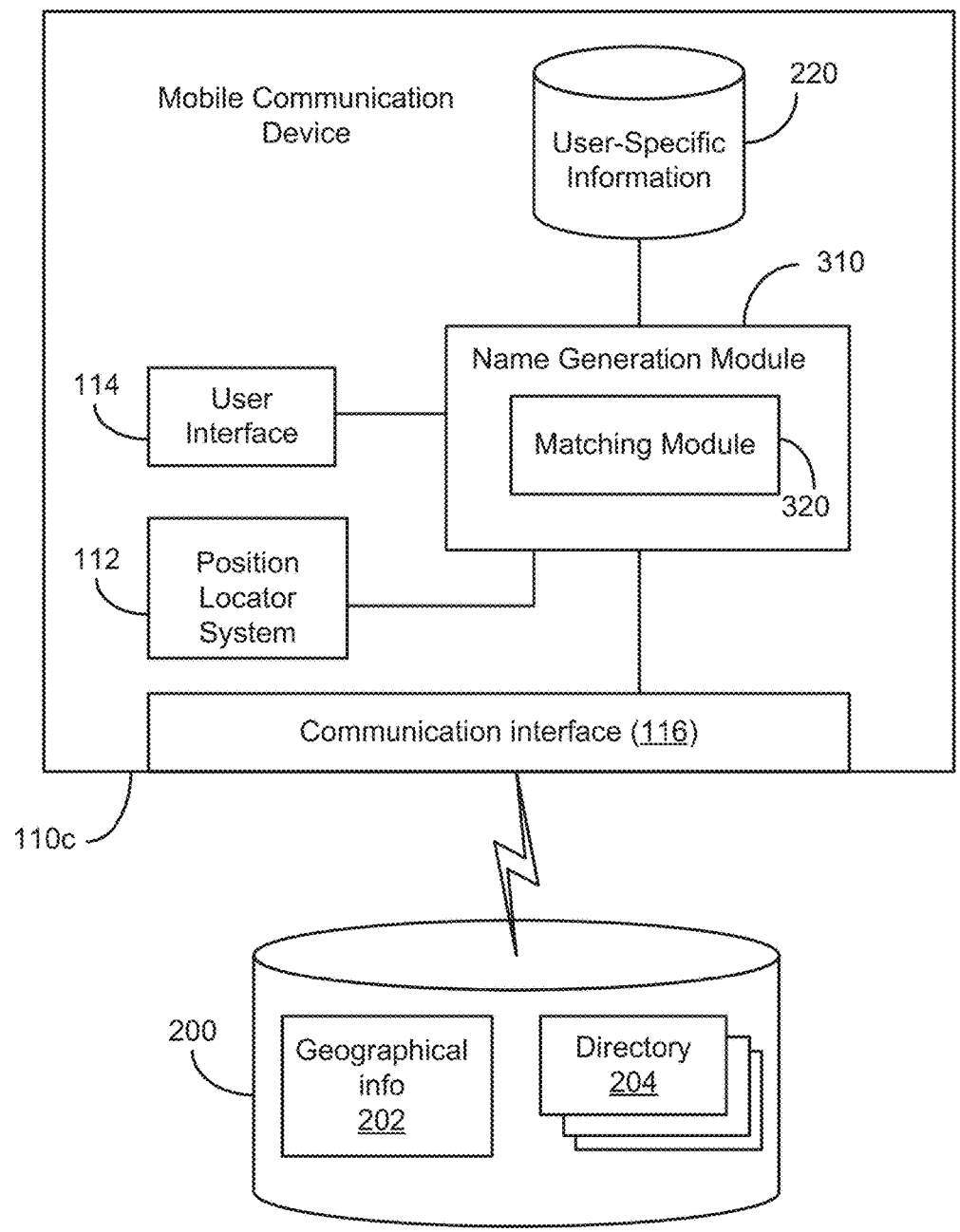

In another embodiment, shown in FIG. 2C, the mobile communication device 110c can host the name generation module 310 and store the user-specific information 220 internally. In this arrangement, the location naming server 300 is not required. Variations of these embodiments may be utilized and structural and functional modifications may be made without departing from the scope of the present disclosure.

Figure 3:
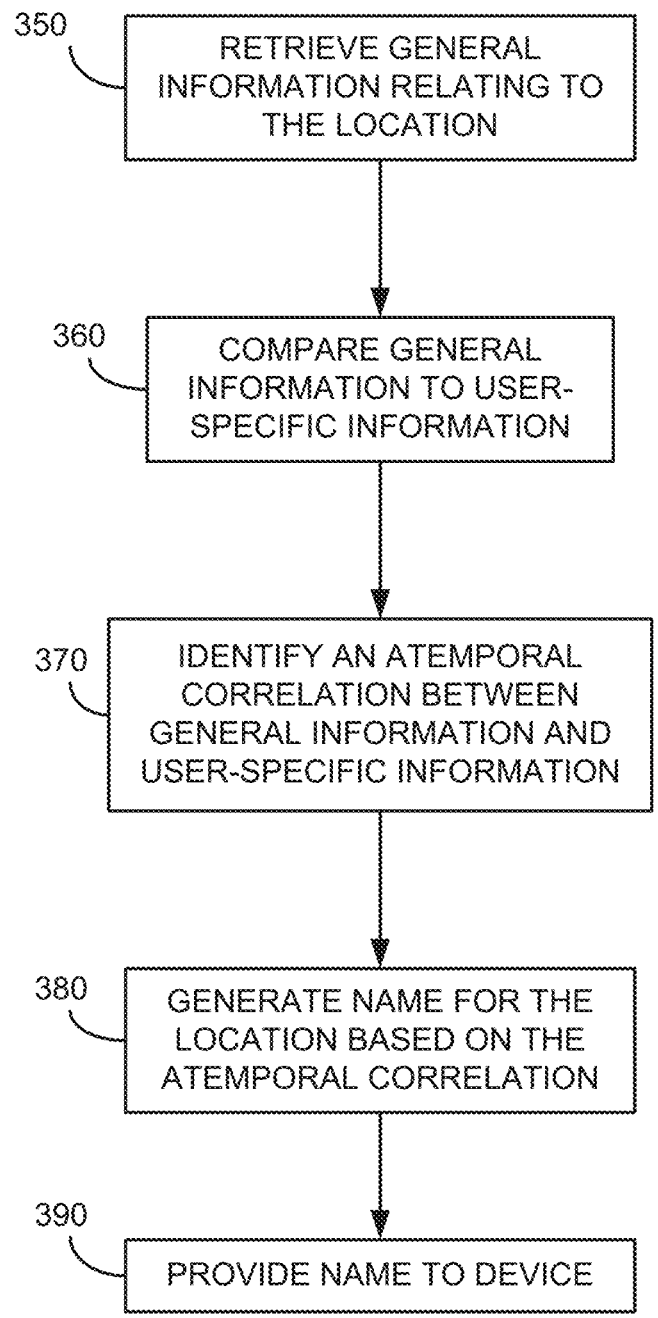
FIG. 3 is a flow diagram illustrating an exemplary process for naming a location according to an exemplary embodiment.

FIG. 3 is a flow diagram illustrating an exemplary process for naming a location according to one embodiment. Referring to FIGS. 2A-2C and FIG. 3, the exemplary process begins when the name generation module 310 receives a location of the mobile communication device 110 and retrieves general information relating to the location from the first data store 200 (block 350). In one embodiment, the location is represented by geospatial coordinates generated by the position locator system 112 in the device 110 or provided by the user 120 via the user interface 114. The geospatial coordinates can be used to identify at least one position at or near the location through the geographical information 202. Each position is correlated to an address and the address can then be used to collect address-specific information through the directories 204, such as phone numbers, names of people, business names, email addresses, and the like. The collected address-specific information for each position is the general information relating to the location.

After the general information has been retrieved, the name generation module 310 compares the general information to the user-specific information (block 360). In one embodiment, a portion of the general information that relates the location to the user-specific information is compared to the user-specific information. For example, when the user-specific information is the user's address book and calendar, the general information that relates the location to the user-specific information can include information typically found in the address book or calendar, e.g., a phone number, email address, street address, person or business name, and/or landmark name.

According to one exemplary embodiment, the matching module 320 is configured to determine an atemporal correlation by comparing the general information to the user-specific information. As stated above, the user-specific information is information managed by or for the user, and can include user items such as the user's address book 222, the call log 224, the message log 226 and the calendar 228. In one embodiment, the matching module 320 can compare the user-specific information in each user item in a specified order reflecting a relative importance of the user item to the location name. For example, entries in the user's address book 222 can be compared first, then entries in the user's call log 224, then entries in the user's message log 226 and finally calendar 228 entries.

The specified order can be designated by the user 120 or by the matching module 320. In one embodiment, the matching module 320 can set a default order and modify the order based on either a user's request or on a user's name selection pattern. For example, if the user 120 repeatedly selects a location name derived from the message log 226, then the matching module 320 can alter the specified order to reflect the user's preference, e.g., compare the user-specific information in the message log 226 first and then turn to the address book 222. The matching module 320 can determine the user's name selection pattern by counting and comparing the number of times the user 120 selects a location name derived from a particular user-specific item.

In one exemplary embodiment, the matching module 320 is configured to determine if a portion of the general information substantially matches a portion of the user-specific information without regard to a time or date the user-specific information was created and/or without regard to a time or date to which the user-specific information might refer. In other words, the matching module 320 is configured to determine an "atemporal" correlation between the general information and the user-specific information (block 370).

In one embodiment, the matching module 320 can be implemented as a simple string matching module that compares two strings and returns true if the two strings are substantially the same. For example, in one embodiment, given two strings S1 and S2, the matching module can parse S1 and S2 based on punctuation characters, such as a space, period, comma, or hyphen, to produce a list of words from each string. From each list of words, common words, e.g., "the", "com", "org", "inc", "street", can be removed. The remaining lists of words L1 and L2 are then compared and if L1 and L2 have one or more words in common, the matching module returns a true response.

In another embodiment, the matching module 320 can support approximate string matching techniques. For example, the matching module 320 can implement a well-known algorithm for matching based on a measure of "distance" between strings, referred to as Levenshtein distance. The Levenshtein distance between two strings is the number of editing steps, e.g., by inserting, deleting, or substituting individual characters, needed to transform one string into the other. In one embodiment, the matching module 320 can approximate matching of two strings by computing the Levenshtein distance and can determine whether a match exists if the distance is below a specified threshold.

The following table is a matching table that illustrates possible atemporal correlations, i.e., matching pairs, of general and user-specific information.

TABLE 1

| | | Phone number | Email address | Street address | Person or Org name | Land-mark |
|---|---|---|---|---|---|---|
| Address book | phone number | √ | | | | |
| | email address | | √ | | √ | |
| | street address | | | √ | | √ |
| | name | | √ | | √ | |
| | organization name | | √ | | √ | |
| Call log | phone number | √ | | | | |
| | name | | √ | | √ | |
| Messaging | email address | | √ | | √ | |
| | name | | √ | | √ | |
| Calendar: | phone number | √ | | | | |
| | name | | √ | | √ | |
| | topic | | | | √ | |

As is shown in Table 1, the column headers represent general information relating to the location and the row headers represent the user-specific items and their respective entries. Because word strings are compared, some entries can produce a positive match result for more than one general information category. For example, while a name in the user's address book 222 can potentially produce a positive match result with the general information name, it can also produce a positive match result with the general information email address if the email address includes the person's name.

In one embodiment, just as the user-specific items can be compared in a specified order, the entries in each user-specific item can also be compared in a specified order. The specified order for the entries can be based on the relative strength of an atemporal correlation or match between an entry and the general information. For example, because a phone number is often closely associated with a person and a location, a positive match result is indicative of a strong atemporal correlation. In contrast, the street address of a location can be associated with a plurality of people who work at or near the location. Accordingly, a positive match result might be less informative and indicative of a weaker atemporal correlation. In one embodiment, the entries in the address book 222 can be compared in the following specified order: phone number, email address, street address, and name/organization name. Other specified orders may be easily implemented according to the user's or designer's preferences.

Once an atemporal correlation has been identified, the name generation module 310 generates a name for the location based on the atemporal correlation (block 380). In one embodiment, the name generation module 310 generates one name for the location when a first atemporal correlation is determined. In this embodiment, when the first atemporal correlation is determined, the matching module 320 ceases comparing the general information to the entries in other user items, thereby potentially eliminating additional database accesses and improving performance. In one embodiment, the name can be associated with the user item from which the atemporal correlation arises. For example, if the first atemporal correlation is identified between a phone number in the user's address book 222 and the general information phone number, then the suggested name can be the user-specific name of the person and/or the organization name in the user's address book 222 associated with the matching phone number.

In another embodiment, the name generation module 310 creates an ordered list of suggested names where each suggested name is associated with a user item from which an atemporal correlation arises. In this embodiment, the matching module 320 compares the general information to the entries in each user item. The suggested names can be listed in the order the user items are compared. For example, suppose the matching module 320 determines atemporal correlations in the user's address book 222 and in the user's message log 226. The suggested name generated from the user's address book 222 can be listed before the suggested name generated from the user's message log 226 when the matching module 320 compares the user-specific information in the address book 222 before the user-specific information in the message log 226.

According to the exemplary embodiment, at least one name is suggested for each user-specific item that produces a positive match result, i.e., the item includes at least one entry that substantially matches the general information. In another embodiment, if a user-specific item fails to produce a positive match result, but does produce an approximate string match, e.g., the Levenshtein distance between an entry in the user-specific item and general information is less than a predetermined threshold, both the user-specific name and the general information name can be suggested. If an atemporal correlation is not identified, i.e., each user-specific item fails to produce a positive match result or an approximate string match, the suggested name can be the general information name.

In one embodiment, as stated above, the general information related to the location can include address-specific information for a plurality positions at or near the location. In this case, at least one suggested name can be generated for each of the plurality of positions at or near the location. In one embodiment, the suggested names can be ordered according to the proximity of the corresponding position to the location. In another embodiment, the suggested names can be ordered according to a degree to which the user-specific information associated with the suggested name correlates to the address data associated with the position. For example, if each entry in each user-specific item substantially matches all of the general information associated with a first position, the correlation is high. Thus, the user-specific name associated with the first position will be placed high on the ordered list of suggested names. In another embodiment, the suggested names can be ordered based on a combination of the position proximity and correlation strength and other factors.

According to an exemplary embodiment, once the suggested name for the location is generated, the name generation module 310 provides the suggested name to the mobile communication device 110 (block 390). In one embodiment, if an ordered list is generated, the first name on the ordered list of suggested names can be automatically selected and provided to the device 110. In another embodiment, the name generation module 310 can provide the ordered list of names to the device 110, where the user 120 can select the name for the location via the user interface 114.

In one embodiment, when the user 120 selects a name for the location, the name and the location can be stored in the second data store 220. In this manner, the name can be retrieved whenever the user 120 returns to the location, or when the user 120 would like to use the name to describe the location to another user. For example, the name for the location can be shared with another user via the system and method described in co-pending patent application Ser. No. 11/425,650, entitled SYSTEM AND METHOD FOR PROVIDING A DESCRIPTOR FOR A LOCATION TO A RECIPIENT, assigned to the assignee of the present invention and filed concurrently herewith.

The executable instructions of a computer program as illustrated in FIG. 3 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium.

More specific examples (a non-exhaustive list) of the computer readable medium can include the following: a portable computer diskette, a random access memory (RAM), a read only memory (ROM), an erasable programmable read only memory (EPROM or Flash memory), an optical fiber, an optical storage device including a portable compact disc (CD), a portable digital video disc (DVD), and the like.

The following example illustrates an exemplary method of naming a location according to one embodiment. In this example, the name generation module 310 retrieves general information relating to the location comprising the following general address data for positions, P1, P2, and P3, at or near the location:

Position P1
Address: 111 Corning Rd, Suite 200, Cary, N.C.
Org name: IPAC
Phone: 919-233-1942
Fax number: 919-662-1992
Email: ted.thomas@ipac-co.com
Position P2
Address: 111 Corning Rd, Suite 201, Cary, N.C.
Org name: NC Education Lottery Commission
Phone: 919-715-6886
Fax number: 919-233-7069
Email: paul.morris@nc.lottery.gov
Position P3
Address: 111 Corning Rd, Suite 111, Cary, N.C.
Org name: TI
Phone: 919-688-5555

The user-specified information includes the following user-specific items and entries:

Address book A1
Name: Ted Thomas
Org name: IPAC
Address (Home): 555 Thomas Road, Raleigh, N.C.
Address (Work): 111 Corning Rd, Suite 200, Cary, N.C.
Email: ted.thomas@ipac-co.com
Work Phone: 919-233-1942 ×200
Call log C1
Name: T Thomas
Type: Outgoing
Phone: 919-233-1942
Email record E1
Name: T Thomas
Email: ted.thomas@ipac-co.com
Email record E2
Name: NC Lottery Help Desk
Email: help@nc.lottery.gov
Calendar entry M1
Name: Ted Thomas
Org name: IPAC
Address: 111 Corning Rd, Cary, N.C.

According to an exemplary embodiment, the address data for each position is compared to the user-specific information. In one embodiment, the user-specific items are compared in the following order: the address book 222, call log 224, message log 226 and calendar 228. The following atemporal correlations are identified: (P1, A1), (P1, C1), (P1, E1), (P2, E2), (P1, M1). Based on each atemporal correlation, the following suggested names can be generated in the following ordered list:

1. Ted Thomas (user-specific name of person in A1)
2. T. Thomas (user-specific name of person in C1)
3. T. Thomas (user-specific name of person in E1)
4. NC Lottery Help Desk (user-specific name of organization in E2)
5. Ted Thomas (user-specific name of person in M1)

In one embodiment, the name generation module 310 can provide the ordered list to the mobile communication device 110 after redundant names have been removed. Alternatively, in another embodiment, the name generation module 310 can select and provide the first name on the ordered list.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:
1. A system for naming a location, the system comprising:
a mobile communication device associated with a user comprising a position locator system configured to identify a location of the mobile communication device;

a first data store for storing general information relating to the location, wherein the general information is managed by or for an entity other than the user;
a second data store for storing user-specific information that is managed by or for the user; and
a name generation module configured to receive the location of the mobile communication device, to retrieve from the first data store general information relating to the location, to generate a plurality of names for the location based on at least one atemporal correlation between the general information relating to the location and the user-specific information, to provide the plurality of names for the location for selection, and to provide for storing the name selected for the location in the second data store from the plurality of names.

2. The system of claim 1 wherein the first data store includes geographical information that maps the location to an address, and at least one directory that maps an address to address-specific information including at least one of a telephone number, electronic message address, name, and business name.

3. The system of claim 1 wherein the user-specific information includes at least one of an address book that organizes contact information for a plurality of contacts, a call log that stores call information, a message log that stores message information, and a calendar that stores events.

4. The system of claim 1 wherein the name generation module includes a matching module configured to compare the general information relating the location to the user-specific information and to detect when a portion of the general information substantially matches a portion of the user-specific information.

5. The system of claim 4 wherein the name generation module is further configured to identify a user-specific name associated with a portion of the user-specific information that substantially matches a portion of the general information relating to the location.

6. The system of claim 4 wherein the name generation module is further configured to identify a name based on the general information for the location when no portion of the user-specific information substantially matches any portion of the general information.

7. A mobile communication device comprising:
a communication interface coupled to a network;
a position locator system configured to identify a location of the mobile communication device; and
a name generation module configured to receive the location of the mobile communication device, to use the location to retrieve general information relating to the location over the network via the communication interface, wherein the general information is managed by or for an entity other than the user, to generate a plurality of names for the location based on at least one atemporal correlation between the retrieved general information relating to the location and user-specific information that is managed by or for a user of the mobile communication device, to provide the plurality of names for the location for selection, and to provide for storing the name selected for the location from the plurality of names.

8. The device of claim 7 further comprising a data store for storing the user-specific information.

9. The device of claim 7 wherein the user-specific information includes at least one of an address book that organizes contact information for a plurality of contacts, a call log that stores call information, a message log that stores message information, and a calendar that stores events.

10. The device of claim 9 wherein the name generation module includes a matching module configured to compare the general information relating the location to the user-specific information and to determine when a portion of the general information substantially matches a portion of the user-specific information.

11. The device of claim 10 wherein the matching module ceases comparing when it determines that a portion of the general information substantially matches a portion of the user-specific information and wherein the name generation module is further configured to identify a user-specific name associated with the portion of the user-specific information that substantially matches the portion of the general information relating to the location.

12. The device of claim 10 wherein the name generation module is further configured to identify a user-specific name associated with any portion of the user-specific information that substantially matches a portion of the general information relating to the location.

13. The device of claim 10 wherein the name generation module is further configured to identify a name based on the general information for the location when no portion of the user-specific information substantially matches any portion of the general information.

14. The device of claim 10 wherein the name generation module is configured to generate a list of suggested names for the location, wherein each suggested name is associated with a position at or near the location and the suggested names are ordered according to a position's proximity to the location.

15. The device of claim 8 wherein the name generation module is configured to store the generated name and the location in the data store in response to the selection of the name, such that the name can be retrieved when the user returns to the location or when the user wishes to share the name with another user.

16. A server for naming a location comprising:
a communication interface for communicating with a mobile communication device associated with a user over a network; and
a name generation module configured to receive a location of the mobile communication device over the network via the communication interface, to use the location to retrieve general information relating to the location over the network via the communication interface, wherein the general information is managed by or for an entity other than the user, to generate a plurality of names for the location based on at least one atemporal correlation between the retrieved general information relating to the location and user-specific information that is managed by or for a user of the mobile communication device, to provide the plurality of names to the mobile communication device over the network via the communication interface, and to provide for storing the name selected for the location from the plurality of names.

17. The server of claim 16 further comprising a data store for storing the user-specific information.

18. The server of claim 16 wherein the user-specific information includes at least one of an address book of the user that organizes contact information for a plurality of contacts, a call log that stores call information, a message log that stores message information, and a calendar that stores events.

19. The server of claim 16 wherein the name generation module includes a matching module configured to compare the general information relating the location to the user-specific information and to determine when a portion of the general information substantially matches a portion of the user-specific information.

20. The server of claim 19 wherein the matching module ceases comparing when it determines that a portion of the general information substantially matches a portion of the user-specific information and wherein the name generation module is further configured to identify a user-specific name associated with the portion of the user-specific information that substantially matches the portion of the general information relating to the location.

21. The server of claim 19 wherein the name generation module is further configured to identify a name based on the general information for the location when no portion of the user-specific information substantially matches any portion of the general information.

22. The server of claim 16 wherein the general information relating to the location comprises address data associated with a plurality of positions at or near the location.

23. The server of claim 22 wherein the name generation module is configured to generate a list of suggested names for the location, wherein each suggested name is associated with a position and the suggested names are ordered according to a position's proximity to the location.

24. The server of claim 22 wherein the name generation module is configured to generate a list of suggested names for the location, wherein each suggested name is associated with a position and the suggested names are ordered according to a degree to which the user-specific information associated with the suggested name correlates to the address data associated with the position.

25. The server of claim 17 wherein the name generation module is configured to store the generated name and the corresponding location in the data store in response to the selection of the name, such that the name can be retrieved when the user returns to the location or when the user wishes to share the name with another user.

26. A method of naming a location at which a user is present with a mobile communication device, the method comprising:
retrieving general information relating to the location, the general information managed by or for an entity other than the user;
comparing the retrieved general information relating the location to user-specific information managed by or for the user;
identifying at least one atemporal correlation between the retrieved general information and the user-specific information;
generating a plurality of names for the location based on the at least one atemporal correlation between the retrieved general information and the user-specific information;
providing the plurality of names for the location for selection; and
storing the name selected for the location from the plurality of names.

27. The method of claim 26 wherein retrieving the general information includes identifying geospatial coordinates associated with the location and using the geospatial coordinates to retrieve general information associated with the coordinates.

28. The method of claim 26 wherein the user-specific information includes at least one of an address book of the user that organizes contact information for a plurality of contacts, a call log that stores call information, a message log that stores message information, and a calendar that stores events.

29. The method of claim 28 wherein identifying the at least one atemporal correlation includes determining when a portion of the general information substantially matches a portion of the user-specific information.

30. The method of claim 29 wherein generating the plurality of names includes identifying a user-specific name associated with any portion of the user-specific information that substantially matches a portion of the general information relating to the location.

31. The method of claim 29 wherein generating the plurality of names further includes generating an ordered list of suggested names comprising identified user-specific names associated with each portion of the user-specific information that substantially matches a portion of the general information relating to the location.

32. The method of claim 26 wherein the general information relating to the location comprises address data associated with a plurality of positions at or near the location and wherein generating the name comprises creating a list of suggested names for the location, wherein each suggested name is associated with a position and the suggested names are ordered according to a position's proximity to the location.

33. The method of claim 26 wherein the general information relating to the location comprises address data associated with a plurality of positions at or near the location and wherein generating the name comprises creating a list of suggested names for the location, wherein each suggested name is associated with a position and the suggested names are ordered according to a degree to which the user-specific information associated with the suggested name correlates to the address data associated with the position.

34. The method of claim 26 further comprising storing the generated name and the corresponding location in response to the selection of the name, such that the name can be retrieved when the user returns to the location or when the user wishes to share the name with another user.

35. The method of claim 26 wherein identifying the at least one atemporal correlation includes determining an approximate match between a portion of the general information and a portion of the user-specific information and wherein generating the name includes identifying a user-specific name associated with the portion of the user-specific information and a general information name associated with the portion of the general information.

36. A non-transitory computer readable medium containing programming instructions for naming a location at which a user is present with a mobile communication device, the program instructions for performing a method comprising:
retrieving general information relating to the location, the general information managed by or for an entity other than the user;
comparing the retrieved general information relating the location to user-specific information managed by or for the user;
identifying at least one atemporal correlation between the retrieved general information and the user-specific information;
generating a plurality of names for the location based on the at least one atemporal correlation between the retrieved general information and the user-specific information;
providing the plurality of names for the location for selection; and storing the name selected for the location from the plurality of names.

37. The computer readable medium of claim 36 wherein the instructions for identifying the at least one atemporal correlation includes detecting when a portion of the general information substantially matches a portion of the user-specific information.

38. The computer readable medium of claim 37 wherein the instructions for generating the plurality of names includes identifying a user-specific name associated with a portion of the user-specific information that substantially matches a portion of the general information relating to the location.

* * * * *